(12) United States Patent
Mogre et al.

(10) Patent No.: US 9,232,118 B1
(45) Date of Patent: Jan. 5, 2016

(54) METHODS AND SYSTEMS FOR DETECTING VIDEO ARTIFACTS

(71) Applicant: Interra Systems, Inc., Cupertino, CA (US)

(72) Inventors: Advait Madhav Mogre, Sunnyvale, CA (US); Bhupender Kumar, Palwal (IN); Shekhar Madnani, Noida (IN)

(73) Assignee: INTERRA SYSTEMS, INC, Cupertino, CA (US)

( * ) Notice: Subject to any disclaimer, the term of this patent is extended or adjusted under 35 U.S.C. 154(b) by 0 days.

(21) Appl. No.: 14/604,290

(22) Filed: Jan. 23, 2015

(51) Int. Cl.
*H04N 5/21* (2006.01)
*H04N 5/14* (2006.01)

(52) U.S. Cl.
CPC . *H04N 5/21* (2013.01); *H04N 5/144* (2013.01)

(58) Field of Classification Search
CPC ......... H04N 5/21; H04N 5/142; H04N 5/144; H04N 5/147; H04N 5/265; H04N 5/213; H04N 5/365; H04N 5/3658; H04N 5/217; H04N 9/646; H04N 19/124; H04N 19/174; H04N 19/176
USPC ........................... 348/607, 620, 622, 625, 701
IPC ................................................. H04N 5/21, 5/00
See application file for complete search history.

(56) References Cited

U.S. PATENT DOCUMENTS

| 5,748,231 | A  * | 5/1998 | Park ........................ | H04N 5/145 348/207.99 |
| 6,594,313 | B1 * | 7/2003 | Hazra ..................... | H04N 7/014 348/E7.013 |
| 6,753,865 | B1 * | 6/2004 | Conklin .................. | H04N 19/80 345/473 |
| 2007/0248163 | A1* | 10/2007 | Zuo ....................... | H04N 19/176 375/240.2 |
| 2007/0286287 | A1* | 12/2007 | Kim ........................ | H04N 19/51 375/240.16 |
| 2007/0293181 | A1* | 12/2007 | Kimura .................... | G06T 5/50 455/302 |
| 2008/0231753 | A1* | 9/2008 | Fujiwara .................. | H04N 5/21 348/607 |
| 2015/0103250 | A1* | 4/2015 | Watanabe ................ | H04N 5/21 348/576 |

* cited by examiner

*Primary Examiner* — Trang U Tran
(74) *Attorney, Agent, or Firm* — Balser & Grell IP Law

(57) ABSTRACT

A system and method for detecting artifacts in a video having a sequence of pictures is described. The method comprises the steps of calculating a motion vector cost and a variable threshold for each of the pictures. In case, the motion vector cost for the picture is greater than the variable threshold of the picture, then a first scene change profile and a second scene change profile for the picture is computed and analyzed for determining the character of the variation in the motion vector cost. An artifact metric for the picture is also calculated and the artifact metric for the picture is compared with a programmable artifact reporting threshold for ascertaining if an artifact is present in the video. The described approach is generic in nature and takes into account various exceptions that may be present within a picture that may be similar in character as an artifact.

18 Claims, 10 Drawing Sheets

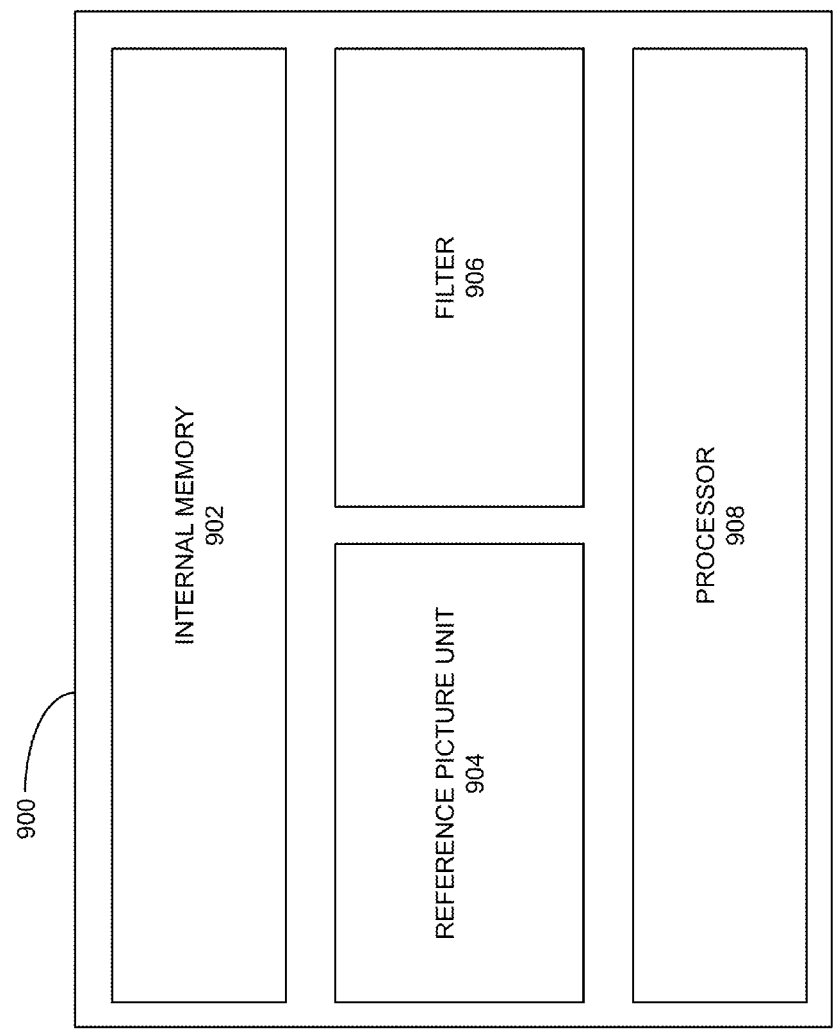

METHODS AND SYSTEMS FOR DETECTING VIDEO ARTIFACTS

FIELD OF THE DISCLOSURE

The presently disclosed embodiments are generally related to video quality check, and more particularly to systems and methods for detecting various artifacts present in a video sequence.

BACKGROUND

A video can be defined as a sequence of a plurality of frames or fields being displayed at a certain frame rate. During the early days of video production technology, a video was captured and broadcasted using a tape based media. With the development of computer related technologies and substantial reduction in the cost related to storage memory and processing power, the tape based media began to be replaced by a file based technology. The adoption of file-based media has spearheaded many advantages for broadcasters. There is ease of media storage and retrieval. There is the enhanced flexibility, speed, and sophistication of non-linear editing. File-based content has even changed the way media is delivered. In the tape-based workflows, many of the processes were handled manually and were cumbersome. With the newfound flexibility of file-based flows, the media files are being compressed and formatted using a wide range of compression technologies, file format types, and delivery formats.

With the flexibility of digital data, complex operations are possible to create various types of output files using sophisticated editing techniques, repurposing, and transcoding. The increase in complex operations on media files increases the possibility of injecting errors into the content. These errors can manifest in metadata of file formats. There may be errors with respect to the non-conformance to variety of compression standards. There may be errors related to degradation of video and audio quality. There may also be errors introduced during digitization of tape-based media. In addition, the advancement of HDTV has led to the consumer being media quality aware and more concerned in terms of the value for their money. In traditional tape-based workflows, the concept of quality control (or QC) had a specific point of applicability and in the context of a specific activity. With file-based workflows, the concept of quality expands to content readiness. Content readiness spans multiple points of applicability in multiple contexts of activities across the content lifecycle. The disruption in content lifecycle due to file-based workflows now expands beyond faster lifecycle and new transformation activities to a third dimension—that of content readiness.

Broadly the video quality issues can be divided into three categories namely sequence error, global error in a frame, and a localized frame error. Sequence error means that there is an issue with the sequence in which the frames are displayed. Global error in a frame means that a major part of the video frame has error; a few examples are Corrupted blocks, luminance/chrominance noise, distorted content, Bit/Packet loss, partial or complete temporal loss. Localized Frame Error means that a few areas of the frame have error; a few examples are block error, misplaced block, DC Coefficient error, Slice/Line error, Scratches and Blotches. Such errors may also be termed as an artifact. There exist a few methods for identifying various types of artifacts that may exist in a video frame. Such methods are generally referred to as Bottom-up Approach as they are detection methods for detecting specific type of issues. In the Bottom-up Approach each issue is handled independently with the advantage of a relatively less number of false positives. Though such an approach is able to detect errors, however, there are certain issues with the approach. Since, the bottom up approach is concerned only with specific types of errors, the approach is unable to handle new types of errors when they arise and lacks global perspective. Although, false positives in a Bottom-up Approach are low but false negatives are very high. Moreover, since the Bottom-up Approach caters to individual issues, its performance degrades with every enhancement to handle a new case.

There is an increasing uncertainty in the quality of content that reaches the consumer. The consumer expectation of HD video and the increasing competition in media industry further add to the quality requirements of media content. Therefore, file-based broadcasting has to deal with constantly evolving technical complexities on one hand and expectations of quality by the consumers on the other. In this scenario, the legacy methods of quality control are inadequate. Manual checks become inconsistent, subjective, and difficult to scale in a globally accessible media workflow. Hence, there exists a need for an error detection approach that is robust and effectively identifies various types of errors that may exist in a video file.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure provides methods and systems for a top-down only approach for error or artifact detection in a video sequence. Top-down only approach involves artifact detection based on generic spatiotemporal characteristics of a video sequence. The top-down only approach being generic in nature identifies any errors in a video sequence irrespective of the specific characteristic of the issue. The approach described in the present disclosure is independent of the nature of the video error, which, within a given field/frame, could be localized or global. Since, the approach is generic in nature it takes into account various exceptions such as scene change, Video information loss, artifact within a picture or a group of consecutive pictures, and the like, that may be similar in character as an error.

In an embodiment, a method for detecting artifacts in a video having a sequence of consecutive one or more pictures is described. The method comprises the steps of calculating a motion vector cost between a current picture and at least one previously filtered picture from the sequence of consecutive one or more pictures. Thereupon, a filter coefficient based on the motion vector cost is calculated. A filter is applied using the filter coefficient on the current picture to create a filtered picture to be used for next iteration. Then, a variable threshold is calculated for each of the one or more pictures, wherein the variable threshold for each picture is based on the variable threshold of the corresponding previous picture. Simultaneously the sequence of one or more pictures is monitored for identifying a scene change. The monitoring of the sequence of one or more pictures comprises comparing the motion vector cost of each picture with the corresponding variable threshold of the picture. In case, the motion vector cost for the picture is greater than the variable threshold of the picture, then a first confidence value is calculated corresponding to a first scene change profile for the picture and a second confidence value is calculated corresponding to a second scene change profile for the picture, wherein the first confidence value and the second confidence value are based on the motion vector cost of the picture, motion vector cost of one or more previous pictures and motion vector cost of one or more subsequent pictures. Thereafter, the first confidence value is compared with the second confidence value for the picture, and a scene change metric for the picture is set to be equal to the first confidence value if the first confidence value is higher than the second confidence value, else setting the scene change metric for the picture to be equal to the second confidence value. An artifact metric for the picture is also calculated, wherein the artifact metric is an exponential function of the motion vector cost of the pictures, variable threshold of the picture, and the scene change metric of the picture; and comparing the artifact metric for the picture with a programmable artifact reporting threshold, if the artifact metric for the picture is greater than the artifact reporting threshold then reporting the video as having an artifact.

In another embodiment, another method for detecting artifacts in a video having a sequence of consecutive one or more pictures is described. The method comprises the steps of calculating a motion vector cost between a current picture and at least one previously filtered picture from the sequence of consecutive one or more pictures. Based on the motion vector cost a filter coefficient is computed. The filter coefficient is used for applying a filter on the current picture to create a filtered picture to be used for next iteration. Thereupon, a variable threshold is calculated for each of the one or more pictures, wherein the variable threshold for each picture is based on the variable threshold of the corresponding previous picture. Simultaneously, the sequence of one or more pictures is monitored for identifying a scene change. The step of monitoring the sequence of one or more pictures comprises of comparing the motion vector cost of each picture in the sequence with the corresponding variable threshold of the picture, and if the motion vector cost for the picture is greater than the variable threshold of the picture, then calculating a first confidence value corresponding to a first scene change profile for the picture and a second confidence value corresponding to a second scene change profile for the picture, wherein the first confidence value and the second confidence value are based on the motion vector cost of the picture, motion vector cost of one or more previous pictures and motion vector cost of one or more subsequent pictures; comparing the first confidence value with the second confidence value for the picture, and setting a scene change metric for the picture to be equal to the first confidence value if the first confidence value is higher than the second confidence value, else setting the scene change metric for the picture to be equal to the second confidence value; calculating an artifact metric for the picture, wherein the artifact metric is an exponential function of the motion vector cost of the pictures, variable threshold of the picture, and the scene change metric of the picture; selectively calculating one or more artifact exception weights for determining impact of one or more exceptions to the artifacts in the video; calculating an artifact reporting metric, wherein the artifact reporting metric equals the product of the artifact metric and one or more selected artifact exception weights; comparing the artifact reporting metric for the picture with a programmable artifact reporting threshold, if the artifact reporting metric for the picture is greater than the artifact reporting threshold then reporting the video as having an artifact.

In yet another embodiment, a system for detecting artifacts in a video having a sequence of consecutive one or more pictures is described. The system comprises of an internal memory, a reference picture unit, a filter, and a processor. The internal memory stores one or more program modules. The reference picture unit is configured for calculating a motion vector cost between a current picture and at least one previously filtered picture from the sequence of consecutive one or more pictures; computing a filter coefficient based on the motion vector cost; and applying a filter using the filter coefficient on the current picture to create a filtered picture to be used for next iteration. The filter is configured for calculating a variable threshold for each of the one or more pictures, wherein the variable threshold for each picture is based on the variable threshold of the corresponding previous picture. Finally, the processor is configured for executing the program modules stored in the internal memory. By means of executing the program modules the processor monitors the sequence of one or more pictures for a scene change. The step of monitoring comprises of comparing the motion vector cost of each picture with the corresponding variable threshold of the picture, and if the motion vector cost for the picture is greater than the variable threshold of the picture, then calculating a first confidence value and a second confidence value for the picture, wherein the first confidence value and the second confidence value are based on the motion vector cost of the picture, motion vector cost of one or more previous pictures and motion vector cost of one or more subsequent pictures; comparing the first confidence value with the second confidence value for the picture, and setting a scene change metric for the picture to be equal to the first confidence value if the first confidence value is higher than the second confidence value, else setting the scene change metric for the picture to be equal to the second confidence value; calculating an artifact metric for the picture, wherein the artifact metric is an exponential function of the motion vector cost of the pictures, variable threshold of the picture, and the scene change metric of the picture; selectively calculating one or more artifact exception weights for determining impact of one or more exceptions to the artifacts in the video; calculating an artifact reporting metric, wherein the artifact reporting metric equals the product of the artifact metric and one or more selected artifact exception weights; and comparing the artifact reporting metric for the picture with a programmable artifact reporting threshold, if the artifact reporting metric for the picture is greater than the artifact reporting threshold then reporting the video as having an artifact.

It is an object of the present disclosure to provide a holistic error detection technique that effectively detects a wide variety of errors or rather does not consider specific types of issues individually.

It is an object of the present disclosure to provide a error detection mechanism that covers a large number of issues and hence results into fewer number of false negatives especially when dealing with artifacts that tend to corrupt a significant portion of the affected picture(s).

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 9 illustrates a block diagram depicting a system for implementing the methods, according to an aspect.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The method for artifact detection described by the present disclosure in certain aspects may be described as a Top-down only approach. The method involves artifact detection based on generic temporal characteristics of a video sequence. Generally, a video is defined as a sequence of a plurality of frames or fields also referred to as pictures.

Figure 1:
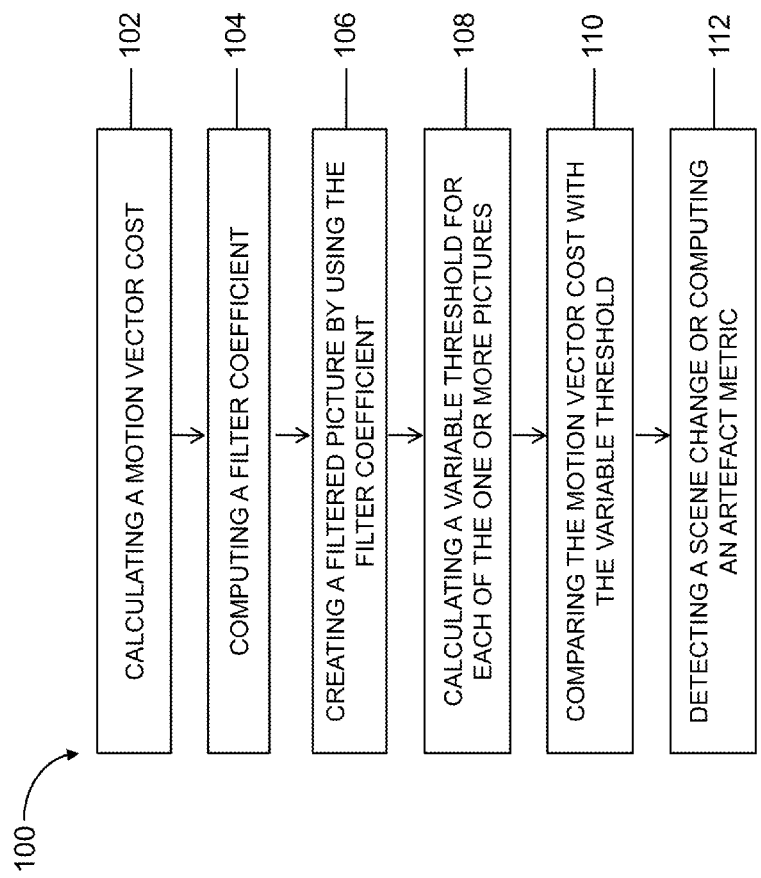
FIG. 1 illustrates a flow diagram depicting a method for detecting artifacts in a video.

FIG. 1 illustrates a diagram depicting method steps for detecting artifacts in a video. The method (100) detects artifacts in a video having a sequence of consecutive one or more pictures, comprises of a plurality of steps. In an aspect, the one or more pictures are one or more frames of the video sequence. In another aspect, the one or more pictures are one or more top fields or one or more bottom fields of the video sequence. The video includes at least a current picture, a previous picture that is present before the current picture, and a next picture that is present after the current picture. The current picture, the previous picture, and the next picture are in a temporal sequence and together form a portion of the video. The method starts at step (102), where a motion vector cost is calculated between a current picture and at least one previously filtered picture from the sequence of consecutive one or more pictures. An example illustration of a method for computing motion vector cost is described in FIG. 8.

At step (104), a filter coefficient is computed based on the motion vector cost. Thereupon, the filter coefficient is utilized at step (106) for applying a filter on the current picture to create a filtered picture to be used for next iteration.

At step (108), a variable threshold is calculated for each of the one or more pictures. In an aspect, the variable threshold for a current picture is computed by a filter such as an Infinite impulse response filter also known as an IIR filter, a Finite impulse response filter also known as an FIR filter, and the like. Such a filter with a gain utilizes the motion vector cost of the current picture computed at step (102) and also utilizes the variable threshold of the corresponding previous picture to result into a variable threshold for the current picture.

At step (110), the motion vector cost for the picture is compared with the variable threshold generated for the current picture. In case, the motion vector cost is less than the variable threshold, then the next picture is set as the current picture for further processing. In another case, if the motion vector cost is greater than the variable threshold, then there may be a possibility of scene change or the presence of an artifact that is further confirmed in step (112).

At step (112), the sequence of one or more pictures is monitored for a scene change or an artifact metric is calculated based on one or more conditions. Initially, the characteristic of the motion vector cost of the current picture is analyzed with respect to the motion vector costs of the one or more previous pictures and he motion vector costs of the one or more next pictures. Profiles of the motion vector cost for the current picture may be computed and further analyzed for determining whether a sudden change in the motion vector cost of the current picture is due to a scene change or whether it is due to a artifact. Both even and odd dominance fields may be taken into consideration while analyzing the motion vector cost profiles.

Figure 2:
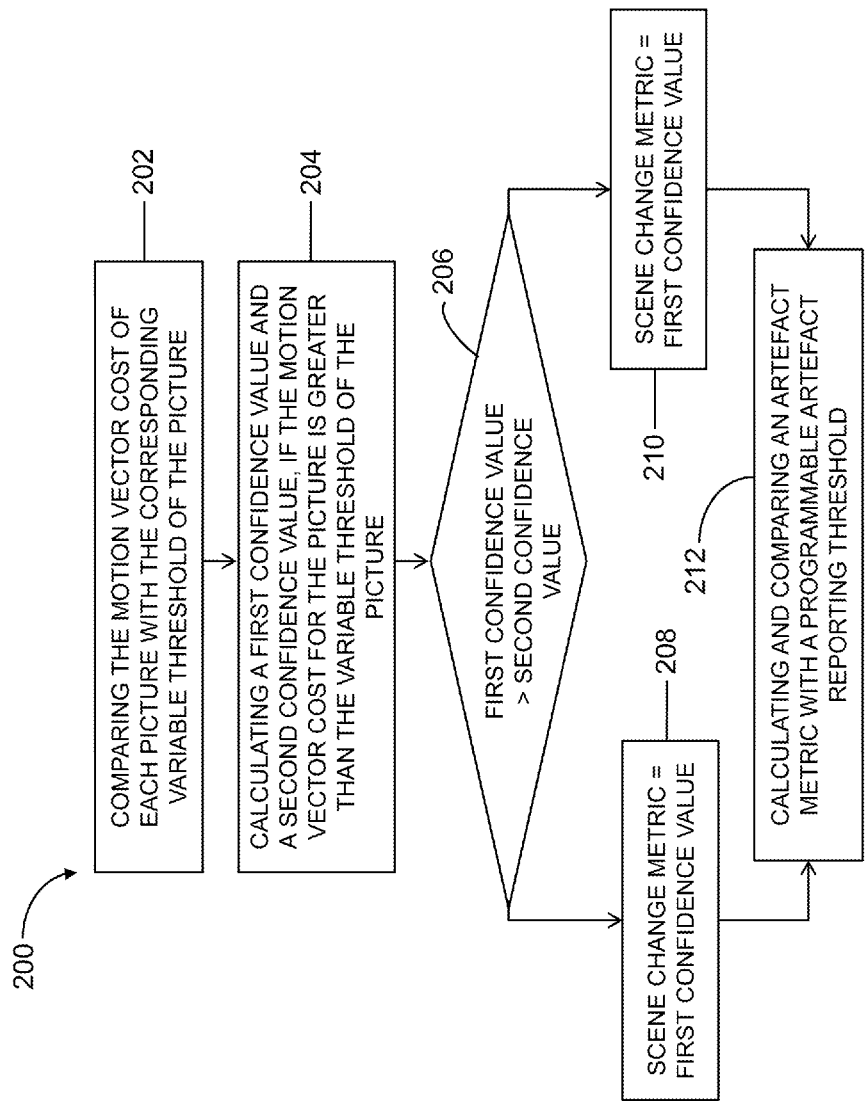
FIG. 2 illustrates a flowchart depicting a method for computing an artifact metric or for detecting a scene change in a video, according to a first embodiment.

There may be a plurality of methods by which the sequence of pictures can be monitored for a scene change. In certain aspects, one or more exceptions to scene may be taken into consideration. In certain other aspects, the exceptions may not be taken into consideration. FIG. 2 illustrates a flowchart depicting a method for monitoring the sequence of one or more pictures for a scene change or computing an artifact metric, according to a first embodiment. The described by FIG. 2 does not take the exceptions into consideration.

The method starts at step (202) where the previously calculated motion vector cost for each picture is compared with the corresponding variable threshold of the picture. In case, the motion vector cost for the picture is greater than the variable threshold of the picture, then at step (204), a first confidence value corresponding to a first scene change profile for the picture and a second confidence value corresponding to a second scene change profile for the picture is calculated. The first confidence value and the second confidence value may be based on the motion vector cost of the current picture, motion vector cost of one or more previous pictures and motion vector cost of one or more next pictures.

The first confidence value is a function of the motion vector cost of the current picture, motion vector cost of one or more previous pictures and motion vector cost of one or more next pictures. The first confidence value is calculated in a case where there is a single spike in the motion vector cost of the current picture in comparison with the motion vector cost of one or more previous pictures and motion vector cost of one or more next pictures. In other words, the motion vector cost is much greater than the motion vector cost of one or more previous pictures as well as the motion vector cost of one or more next pictures. In such a situation the graph of the motion vector cost may show a spike similar to an isosceles triangle, with the spike present for the current picture. In an example aspect, the first confidence value may be represented as First confidence value=$1.0-((mvc[i+1]+((mvc[i-1]+mvc[i-2])/2))/(2*mvc[i]))^{K2}$ Wherein, mvc represents the motion vector cost, i is the picture index with i representing the current picture, and K2 represents a programmable constant within a predefined range.

The second confidence value is a function of the motion vector cost of the current picture, motion vector cost of one or more previous pictures and motion vector cost of one or more next pictures. The second confidence value is calculated for a case when the motion vector cost displays an abnormal behaviour over a plurality of subsequent pictures. In other words, the motion vector cost of the current picture is much greater than the motion vector cost of the next picture and the motion vector cost of the previous picture is greater than pictures present before the previous picture. In such a situation the graph of the motion vector cost may show a trapezoidal, with one spike present for the current picture and another spike present for the previous picture. In an example aspect, the second confidence value may be represented as Second confidence value=$Temp*(1.0-(abs(mvc[i]-mvc[i-1])/mvc[i])K1)$ Wherein, Temp=$1.0-((mvc[i+1]+mvc[i-2])/(float)(mvc[i]+mvc[i-1]))K4$, and mvc represents the motion vector cost, i is the picture index with i representing the current picture, and K1 and K4 represent a programmable constant within a predefined range.

At step (206), the first confidence value is compared with the second confidence value for the picture. In case, the first confidence value is higher than the second confidence value then at step (208) a scene change metric for the picture is set to be equal to the first confidence value. Otherwise at step (210), the scene change metric for the picture is set to be equal to the second confidence value.

Finally, at step (212), an artifact metric for the picture is calculated and compared with a programmable artifact reporting threshold. The artifact metric is an exponential function of the motion vector cost of the pictures, variable threshold of the picture, and the scene change metric of the picture based on which the artifact metric is calculated. The artifact metric for the picture is then compared with a programmable artifact reporting threshold, if the artifact metric for the picture is greater than the artifact reporting threshold then reporting the video as having an artifact.

Figure 3A:
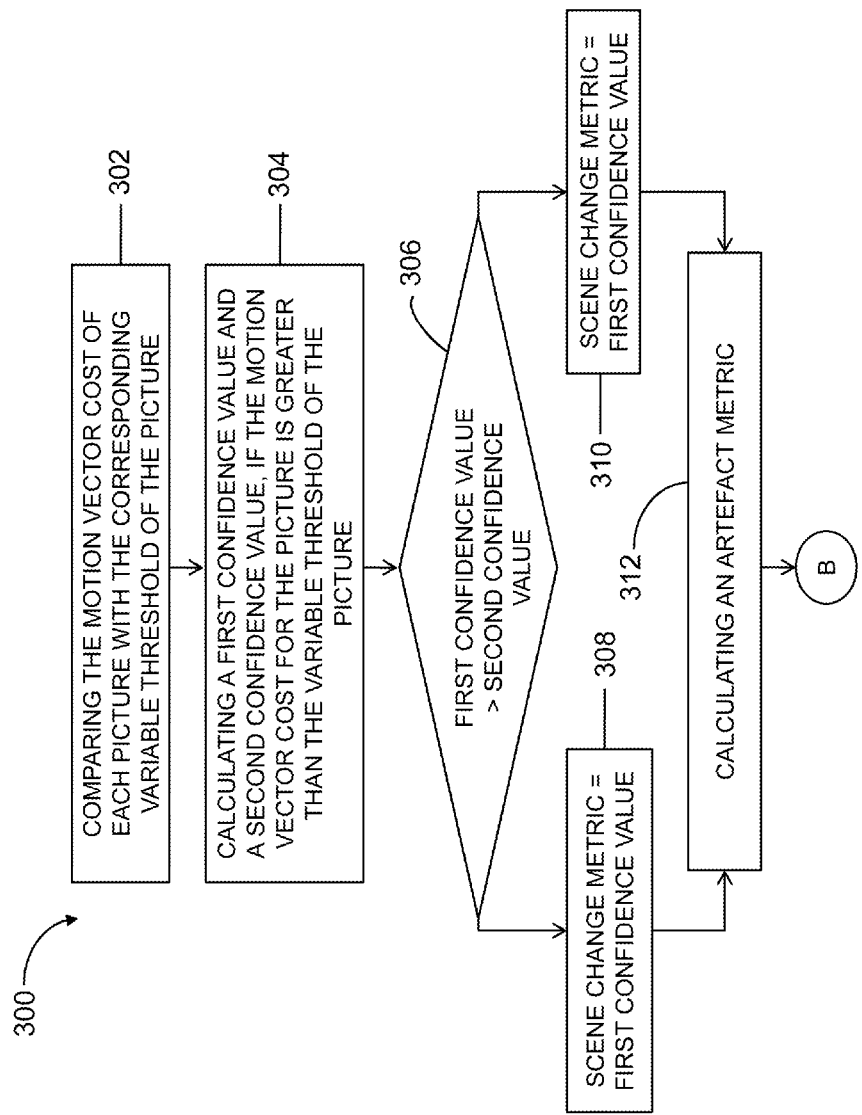
FIG. 3A and FIG. 3B illustrates a flowchart depicting a method for computing an artifact metric for detecting artifacts in a video, according to a second embodiment.
Figure 3B:
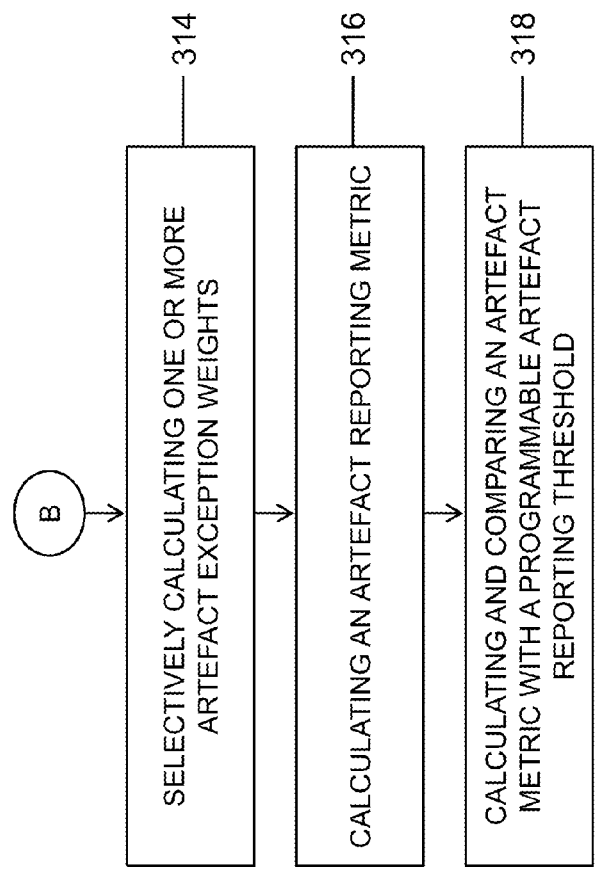

FIG. 3A and FIG. 3B illustrates a flowchart depicting a method for monitoring the sequence of one or more pictures for a scene change, according to a second embodiment. One of the embodiments takes into consideration various exceptions that may occur in a video that may render a spike or change in the characteristic of motion vector cost. Such a change may not be a artifact or artifact, hence, it is important to take such an exception into consideration.

In an aspect, a rapid motion in a video stream may be identified as an artifact due to the changes that are induced in the motion vector cost due to such rapid motion. For example, video having animation or special effects with rapid or jerky motion generally have a very uneven motion flow that is at times outside the MC search range. In such scenarios, the motion vector Cost profile displays spikes commensurate with the untrackable motion that resulted in a high accumulated sum of absolute difference (SAD) cost. Thus, for a video a high 'action' sequence burst may manifest as a series of 'scene changes' in relatively short order that may in turn spike the motion vector cost thereby making the above described algorithm vulnerable to outputting a false positive. Therefore, a metric is constructed to monitor the density of scene changes over a predefined consecutive number of processed pictures. At the end of each predefined consecutive number of processed pictures, the number of scene changes is noted and the scene change counter is reset. The noted scene change number is then passed through a leaky accumulator (or IIR filter) to smoothen the result in order to make it usable.

Figure 4:
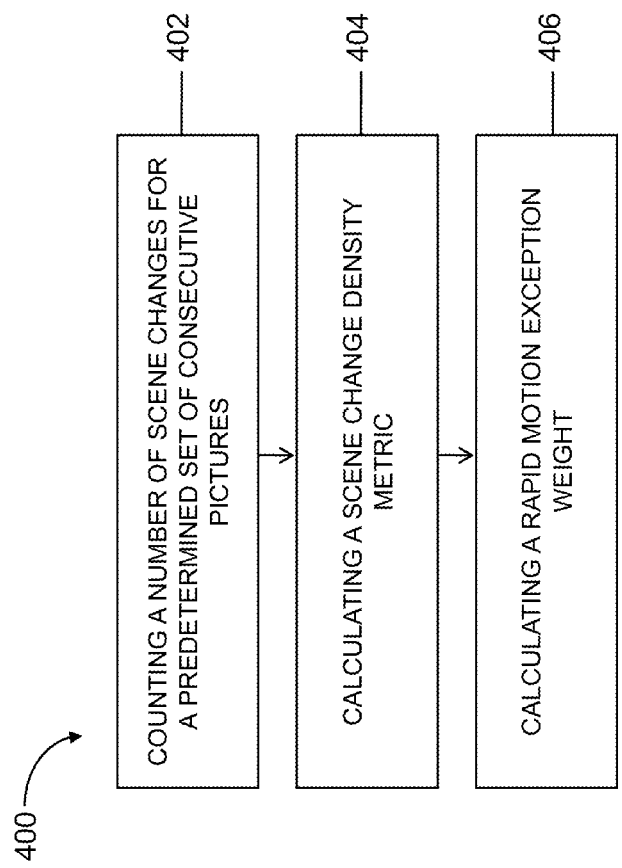
FIG. 4 illustrates a flowchart depicting calculating rapid motion exception weight, according to one of the aspects.

FIG. 4 illustrates a flowchart depicting calculating rapid motion exception weight, according to one of the aspects. At step (402), a number of scene changes is counted for a predetermined set of consecutive pictures. Thereafter, a scene change density metric is calculated at step (404). The scene change density metric is equal to the output of a leaky accumulator Infinite Impulse Response filter taking the number of scene changes for the predetermined set of consecutive pictures as input. Finally at step (406), a rapid motion exception weight is calculated wherein the rapid motion exception weight equals an exponential function of the scene change density metric.

The next factor that could adversely impact distinguishing between a genuine scene change and a artifact could be the presence of cadence, i.e. some sort of a rate conversion of the uncompressed source. This could potentially impact both frame based as well as field based picture processing. (e.g. whenever there is a picture repeat, the MV Cost goes low).

Figure 5:
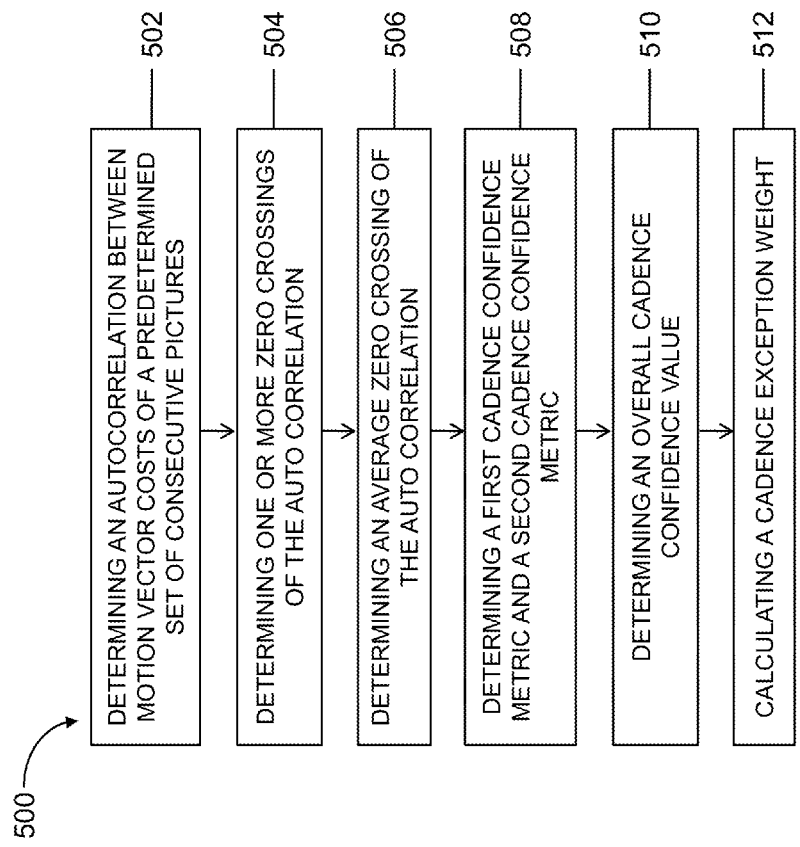
FIG. 5 illustrates a flowchart depicting calculating cadence exception weight, according to one of the aspects.

FIG. 5 illustrates a flowchart depicting calculating cadence exception weight, according to one of the aspects. Initially, a programmable sliding window or a FIFO queue is created with a predefined width. The sliding window receives picture by picture motion vector cost as its input. At step (502), an autocorrelation between motion vector costs in the sliding window of a predetermined set of consecutive pictures is determined. Then at step (504), one or more zero crossings of the auto correlation are determined. Further, an average zero crossing of the auto correlation is determined at step (506). A cadence pattern and periodicity are determined which is based on the average zero crossing or peak-to-peak interval, for example, for 3-2-2-3 or 2-3-3-2 type pull down, the periodicity is equal to 5. In another example, for 16 fps to 24 fps frame rate conversion, the periodicity is equal to 13. Based on the cadence pattern, the pictures belonging to a particular cadence periodicity are accumulated in a heuristic. Such heuristics are then further processed for determining at least a first cadence confidence metric and a second cadence confidence metric, at step (508). In an aspect, the confidence metrics may be set initially to 0 or to any other reference value. The first cadence confidence metric is determined by calculating a zero crossing distance. Then peak to peak/zero crossing distance is compared for a current picture and a previous picture present in a particular heuristic. If the zero crossing distance between the current picture and the previous picture is equal and the zero crossing distance is equal to the periodicity of the particular heuristic containing the current picture and the previous picture, then the first cadence confidence metric is incremented by a particular predefined value. The total first cadence confidence metric for a particular heuristic is then compared with a threshold maximum confidence value, in case the total first cadence confidence metric turns out to be greater than the threshold maximum confidence value, then the first cadence confidence metric for a particular heuristic is clamped and set equal to the threshold maximum confidence value.

In another case, if the zero crossing distance between the current picture and the previous picture is offset by 1 from the periodicity of the particular heuristic, then the first cadence confidence metric for a particular heuristic is decremented by a first value. Else if the zero crossing distance between the current picture and the previous picture is offset by any other value from the periodicity of the particular heuristic, then the first cadence confidence metric for a particular heuristic is decremented by a second value. The first value being lesser than the second value. In a situation, if the total first cadence confidence metric turns out to be less than or equal to 0.0, then the first cadence confidence metric is set equal to 0. A similar approach is followed for calculating the second cadence confidence metric or any number of cadence confidence metrics based on the heuristics.

At step (510), an overall cadence confidence value is determined, wherein the overall cadence confidence value equals the maximum of either first cadence confidence metric or the second cadence confidence metric clamped between zero and a predetermined clamping threshold. Finally, a cadence exception weight is calculated at step (512). The cadence exception weight equals an exponential function of the product of the overall cadence confidence value, the predetermined clamping threshold and one or more programmable constants. In an aspect, a method as described in US Patent application number US20130259392 assigned to the assignee of the present application may also be used for determining a cadence pattern.

In another aspect, presence of flashiness may adversely impact the above described method from differentiating between a genuine scene change and an artifact as the change in the motion vector cost may be due to the presence of sudden flashes such as strobe effects or flash photography. A flash introduces a sudden increase in the luminance of a given picture due which the motion vector cost may suddenly spike.

Figure 6:
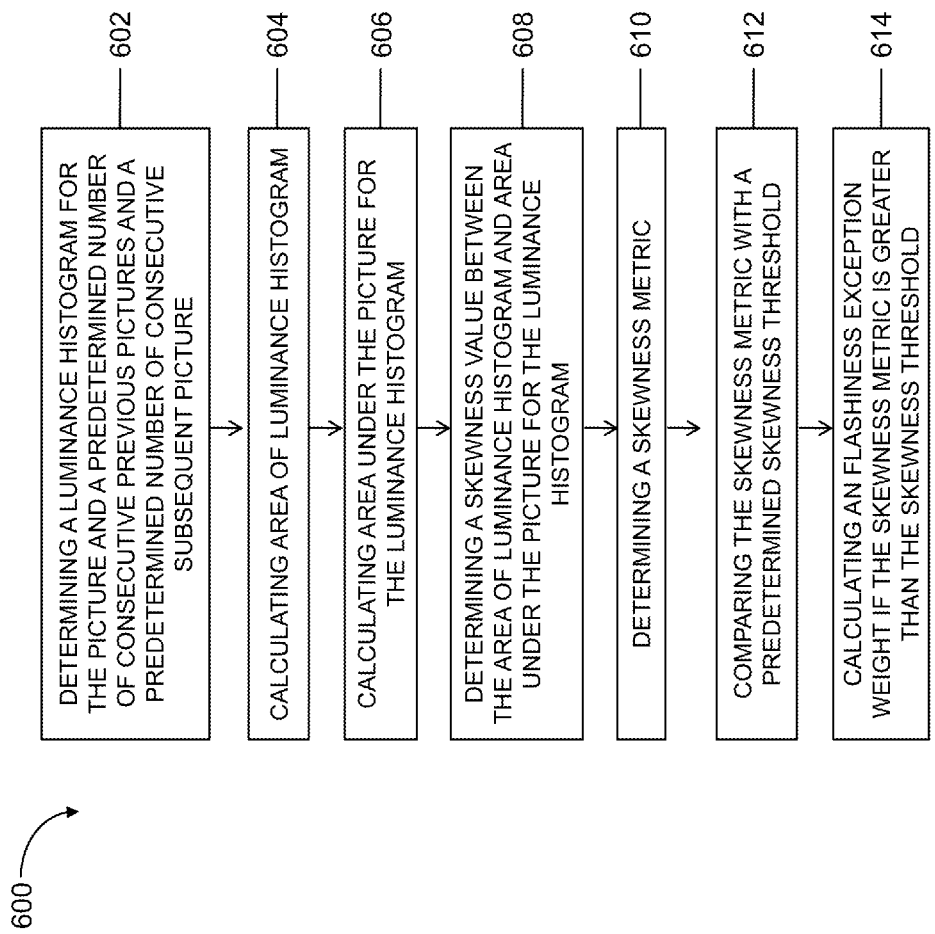
FIG. 6 illustrates a flowchart depicting calculating flashiness exception weight, according to one of the aspects.

FIG. 6 illustrates a flowchart depicting calculating flashiness exception weight, according to one of the aspects. At step (602), each picture of the video is divided into a plurality of predefined number of bins and a luminance histogram is calculated for each bin. For example, each picture may be divided into 8 bins and a luminance histogram of each of the 8 bins is computed.

At steps (604), an area of luminance histogram of a particular picture is calculated by adding the luminance histogram of each of the predefined number of bins. For example, if each picture has been divided into 8 bins i.e. bin [0] to bin [7] then luminance histogram of bin [0] to bin [7] is added to get the area of luminance histogram of a particular picture.

At step (606), an area of luminance histogram under a predefined number of last bins of a particular picture is calculated. For example, if each picture has been divided into 8 bins i.e. bin [0] to bin [7] and predefined number of last bins is 2 then area of luminance histogram under bin [6] and bin [7] may be calculated.

At step (608), a normalized skewness value is calculated for a particular picture by dividing the area of luminance histogram of the particular picture by the area of luminance histogram under a predefined number of last bins of the particular picture. Such a normalized skewness value is calculated for all the pictures showing an abnormal MV cost character and at least one corresponding previous picture.

At step (610), a skewness metric is determined, wherein the skewness metric equals the difference between the skewness value of the previous picture and the skewness value of the current picture.

Thereafter at step (612), the skewness metric is compared with a predetermined skewness threshold, if the skewness metric is greater than the skewness threshold then a flashiness exception weight is calculated at step (614), wherein the flashiness exception weight equals an exponential function of the skewness metric.

In another aspect, presence of blurriness may adversely impact the above described method of identifying an artifact based on motion vector cost. Blurriness or motion blur may occur in a video over a sequence of consecutive pictures due to special cinematographic effects such as advertisements, action films, animation, and the like. Blurriness may occur due a plurality of reasons such as due to a fast moving object or due to a camera pan that typically results in significant loss of detail. Therefore, there is a need for determining a an exception weight that may be taken into consideration along with the motion vector cost for determining an artifact in a video stream.

Figure 7:
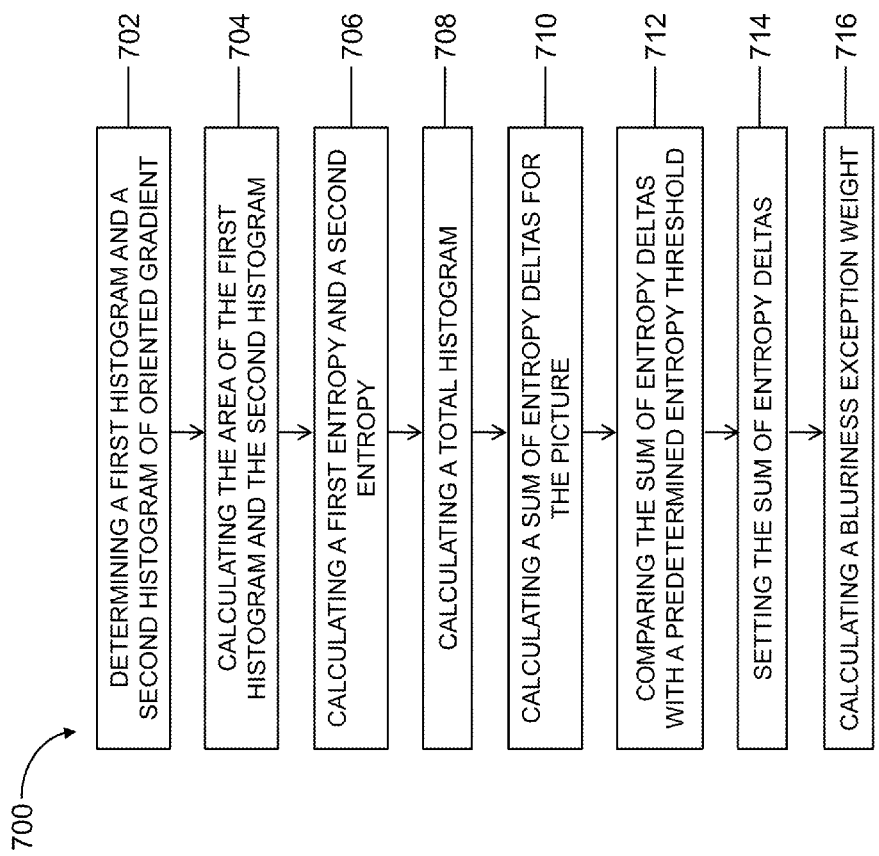
FIG. 7 illustrates a flowchart depicting calculating blurriness exception weight, according to one of the aspects.

FIG. 7 illustrates a flowchart depicting calculating blurriness exception weight, according to one of the aspects. The method generally comprises a plurality of steps starting with the step (702) where a first histogram of oriented gradient computed over the x direction and a second histogram of oriented gradient computed over the y direction is determined for the entire picture. At step (704), the area of the first histogram of oriented gradient computed over the x direction and the area of the second histogram of oriented gradient computed over the y direction is calculated. Thereafter at step (706), a first entropy of the histogram of oriented gradient computed over the x direction and calculating a second entropy of the histogram of oriented gradient computed over the y direction is calculated.

At step (708), the first entropy and the second entropy are utilized for calculating a total histogram of oriented gradient entropy. The total histogram of oriented gradient entropy is equal to the summation of the first entropy of the histogram of oriented gradient computed over the x direction and the second entropy of the histogram of oriented gradient computed over the y direction. Thereafter, a sum of entropy deltas for the picture is calculated at step (710), wherein the sum of entropy deltas equals the summation of the difference between two consecutive pictures for a predetermined set of consecutive pictures.

At step (712), the sum of entropy deltas calculated at step (710) is compared with a predetermined entropy threshold. The predetermined entropy threshold may be provided by a user based on the requirements and various experiments. Based on the comparison of the sum of entropy deltas and the predetermined entropy threshold a sum of entropy deltas metric is set at step (714). In an aspect, if the sum of entropy deltas for the picture is greater than the predetermined entropy threshold then the sum of entropy deltas metric is set to zero, otherwise the sum of entropy deltas metric is set to a function of the difference of the predetermined entropy thresholds and the sum of entropy deltas. In an aspect, function of the difference of the predetermined entropy thresholds and the sum of entropy deltas may be presented as −5.0*(K16−sum_of_entropy_deltas)/(K16−K15), wherein K16 and K15 are predetermined entropy thresholds that may be provided by the user. Finally, a blurriness exception weight is calculated at step (716) wherein the blurriness exception weight equals an exponential function of the sum of entropy deltas metric. In an aspect, the blurriness exception weigh may be in a closed range of [0, 1].

Figure 8:
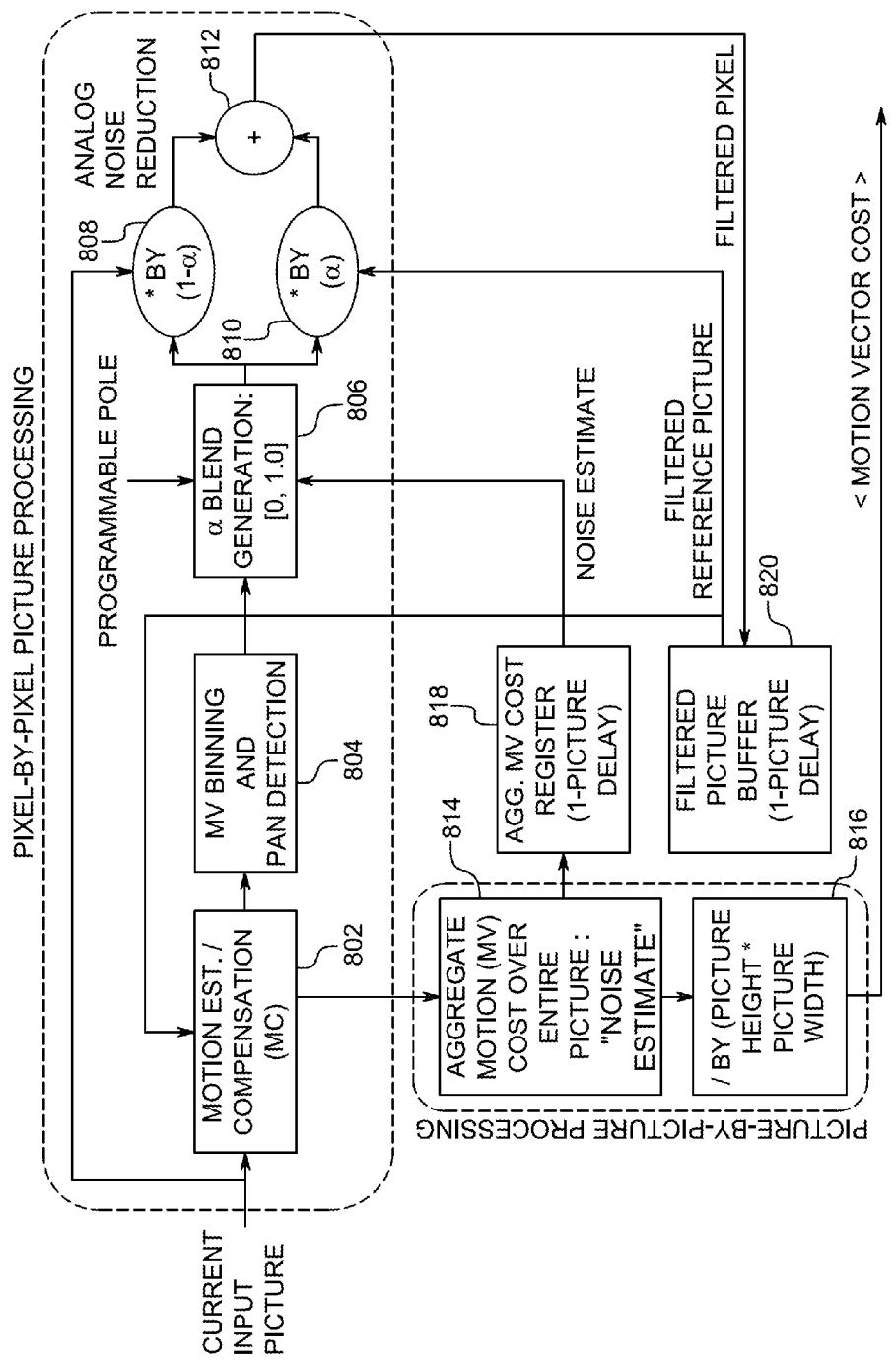
FIG. 8 depicts an example illustration a block diagram depicting a method for calculating a motion vector cost.

FIG. 8 illustrates a block diagram depicting an example method for calculating a motion vector cost. Motion vector may be defined as the vector by which one of the objects in the current picture has moved with respect to its previous picture. The calculation of motion vector cost is an iterative process that takes into consideration the motion vector cost computed at various spatial locations. A number of motion estimation techniques exist such as Exhaustive Search, Three step search, 2D Logarithmic Search, Orthogonal search, and the like. Motion compensation is the process in which the generated Motion vector of the previous picture is used to get the similar blocks in the current picture from the previous picture. In this way the compensated block in previous picture is compared with the block in current picture. Input to the motion vector estimation method is the current and previous pictures. A general methodology for determining motion estimation is to divide the picture into equal sized blocks, for example, 8×8 blocks, 16×16 blocks, and the like. Each block is then searched in the previous picture based on various kinds of similarity measures. The similarity measure may be based on Mean square error (MSE), Sum of Squared Differences (SSD), Correlation Factor, Feature vectors, and the like. The block is searched in a defined search area. The location at which the optimum similarity measure is achieved provides the motion vector and the optimum similarity measure is termed here as "MV Cost". We can say that the minimum of MSE or SSD or maximum of Correlation is the MV Cost for a motion vector of a block. The MV cost is generated for all the blocks and the final aggregate of the all the MV costs for a frame can be termed as "Aggregate MV cost" as in block (814).

Motion vector binning and Pan detection (804) is used to detect if there exists Camera panning while capturing of the video sequence. One of the simple techniques that are used is to check the similarity of the direction of the motion vectors corresponding to neighbouring blocks. For each block, the motion vector direction is one of the values between 0-8. 0 is for motion vector length equal to zero. Motion vector direction index of the central block (B5) is compared with the neighbouring blocks and if most of the blocks are with similar direction, then the block is marked as 'panned'. In this way, all the blocks in frame are marked for panning FIG. 9 illustrates a block diagram depicting a system for implementing the methods, according to an aspect. The system (900) for detecting artifacts in a video having a sequence of consecutive one or more pictures comprises of an internal memory (902), a reference picture unit (904), a filter (906), and a processor (908). The internal memory (902) stores one or more program modules. The reference picture unit (904) is configured for calculating a motion vector cost between a current picture and at least one previously filtered picture from the sequence of consecutive one or more pictures. The reference picture unit (904) is also configured for computing a filter coefficient based on the motion vector cost; and applying a filter using the filter coefficient on the current picture to create a filtered picture to be used for next iteration. The filter (906) is configured for calculating a variable threshold for each of the one or more pictures, wherein the variable threshold for each picture is based on the variable threshold of the corresponding previous picture. The processor (908) is configured for executing the program modules stored in the internal memory; wherein the processor is configured for monitoring the sequence of one or more pictures for a scene change. The step of monitoring comprises of comparing the motion vector cost of each picture with the corresponding variable threshold of the picture, and if the motion vector cost for the picture is greater than the variable threshold of the picture, then calculating a first confidence value and a second confidence value for the picture, wherein the first confidence value and the second confidence value are based on the motion vector cost of the picture, motion vector cost of one or more previous pictures and motion vector cost of one or more subsequent pictures; comparing the first confidence value with the second confidence value for the picture, and setting a scene change metric for the picture to be equal to the first confidence value if the first confidence value is higher than the second confidence value, else setting the scene change metric for the picture to be equal to the second confidence value; calculating an artifact metric for the picture, wherein the artifact metric is an exponential function of the motion vector cost of the pictures, variable threshold of the picture, and the scene change metric of the picture; selectively calculating one or more artifact exception weights for determining impact of one or more exceptions to the artifacts in the video; calculating an artifact reporting metric, wherein the artifact reporting metric equals the product of the artifact metric and one or more selected artifact exception weights; and comparing the artifact reporting metric for the picture with a programmable artifact reporting threshold, if the artifact reporting metric for the picture is greater than the artifact reporting threshold then reporting the video as having an artifact.

In an aspect, the reference picture unit (904) is configured for calculating filtered pixels for each picture by calculating a weighted sum of each pixel of the current picture and filtered pixel of the previous picture wherein the weight is based on the motion estimation of one or more previous pictures.

In another aspect, the filter (906) may be a Finite impulse response filter. In yet another aspect, the filter (906) may be an Infinite impulse response filter.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for detecting artifacts in a video having a sequence of consecutive one or more pictures, comprising the steps of:
   calculating a motion vector cost between a current picture and at least one previously filtered picture from the sequence of consecutive one or more pictures;
   computing a filter coefficient based on the motion vector cost;
   applying a filter using the filter coefficient on the current picture to create a filtered picture to be used for next iteration;
   calculating a variable threshold for each of the one or more pictures, wherein the variable threshold for each picture is based on the variable threshold of the corresponding previous picture;
   monitoring the sequence of one or more pictures for a scene change, wherein the step of monitoring comprises of
   comparing the motion vector cost of each picture with the corresponding variable threshold of the picture, and if the motion vector cost for the picture is greater than the variable threshold of the picture, then
      calculating a first confidence value corresponding to a first scene change profile for the picture and a second confidence value corresponding to a second scene change profile for the picture, wherein the first confidence value and the second confidence value are based on the motion vector cost of the picture, motion vector cost of one or more previous pictures and motion vector cost of one or more subsequent pictures;
      comparing the first confidence value with the second confidence value for the picture, and setting a scene change metric for the picture to be equal to the first confidence value if the first confidence value is higher than the second confidence value, else setting the scene change metric for the picture to be equal to the second confidence value;
      calculating an artifact metric for the picture, wherein the artifact metric is an exponential function of the motion vector cost of the pictures, variable threshold of the picture, and the scene change metric of the picture; and
      comparing the artifact metric for the picture with a programmable artifact reporting threshold, if the artifact metric for the picture is greater than the artifact reporting threshold then reporting the video as having an artifact.

2. The method as claimed in claim 1, wherein the one or more pictures is one or more frames of the video sequence.

3. The method as claimed in claim 1, wherein the one or more pictures is one or more top fields or one or more bottom fields of the video sequence.

4. The method as claimed in claim 1, wherein the filtered pixel for each picture is calculated by calculating a weighted sum of each pixel of the current picture and filtered pixel of the previous picture wherein the weight is based on the motion estimation of one or more previous pictures.

5. A method for detecting artifacts in a video having a sequence of consecutive one or more pictures, comprising the steps of:
   calculating a motion vector cost between a current picture and at least one previously filtered picture from the sequence of consecutive one or more pictures;
   computing a filter coefficient based on the motion vector cost;
   applying a filter using the filter coefficient on the current picture to create a filtered picture to be used for next iteration;
   calculating a variable threshold for each of the one or more pictures, wherein the variable threshold for each picture is based on the variable threshold of the corresponding previous picture;
   monitoring the sequence of one or more pictures for a scene change, wherein the step of monitoring comprises of
   comparing the motion vector cost of each picture with the corresponding variable threshold of the picture, and if the motion vector cost for the picture is greater than the variable threshold of the picture, then
      calculating a first confidence value corresponding to a first scene change profile for the picture and a second confidence value corresponding to a second scene change profile for the picture, wherein the first confidence value and the second confidence value are based on the motion vector cost of the picture, motion vector cost of one or more previous pictures and motion vector cost of one or more subsequent pictures;
      comparing the first confidence value with the second confidence value for the picture, and setting a scene change metric for the picture to be equal to the first confidence value if the first confidence value is higher than the second confidence value, else setting the scene change metric for the picture to be equal to the second confidence value;
      calculating an artifact metric for the picture, wherein the artifact metric is an exponential function of the motion vector cost of the pictures, variable threshold of the picture, and the scene change metric of the picture;
      selectively calculating one or more artifact exception weights for determining impact of one or more exceptions to the artifacts in the video;
      calculating an artifact reporting metric, wherein the artifact reporting metric equals the product of the artifact metric and one or more selected artifact exception weights;
      comparing the artifact reporting metric for the picture with a programmable artifact reporting threshold, if the artifact reporting metric for the picture is greater than the artifact reporting threshold then reporting the video as having an artifact.

6. The method as claimed in claim 5, wherein the filtered pixel for each picture is calculated by calculating a weighted sum of each pixel of the current picture and filtered pixel of the previous picture wherein the weight is based on the motion estimation of one or more previous pictures.

7. The method as claimed in claim 5, wherein the step of calculating one or more artifact exception weights comprises of counting a number of scene changes for a predetermined set of consecutive pictures;

calculating a scene change density metric, wherein the scene change density metric equals the output of a leaky accumulator Infinite Impulse Response filter taking the number of scene changes for the predetermined set of consecutive pictures as input;

calculating a rapid motion exception weight wherein the rapid motion exception weight equals an exponential function of the scene change density metric.

8. The method as claimed in claim 5, wherein the step of calculating one or more artifact exception weights comprises of determining an autocorrelation between motion vector costs of a predetermined set of consecutive pictures;

determining one or more zero crossings of the auto correlation;

determining an average zero crossing of the auto correlation;

determining a first cadence confidence metric and a second cadence confidence metric;

determining an overall cadence confidence value, wherein the overall cadence confidence value equals the maximum of either first cadence confidence metric or the second cadence confidence metric clamped between zero and a predetermined cadence threshold; and calculating a cadence exception weight wherein the cadence exception weight equals an exponential function of the product of the overall cadence confidence value and the predetermined cadence threshold.

9. The method as claimed in claim 5, wherein the step of calculating one or more artifact exception weights comprises of determining a luminance histogram for the picture and a predetermined number of consecutive previous pictures and a predetermined number of consecutive subsequent picture;

calculating area of luminance histogram;

calculating area under the picture for the luminance histogram;

determining a skewness value between the area of luminance histogram and area under the picture for the luminance histogram, wherein the skewness value equals the result of the division of the area of luminance histogram by the area under the picture for the luminance histogram;

determining a skewness metric, wherein the skewness metric equals the difference between the skewness value of the previous picture and the skewness value of the current picture; and comparing the skewness metric with a predetermined skewness threshold, and if the skewness metric is greater than the skewness threshold then calculating an blurriness exception weight wherein the blurriness exception weight equals an exponential function of the skewness metric.

10. The method as claimed in claim 5, wherein the step of calculating one or more artifact exception weights comprises of determining a first histogram of oriented gradient computed over the x direction and a second histogram of oriented gradient computed over the y direction for the entire picture;

calculating the area of the first histogram of oriented gradient computed over the x direction and the area of the second histogram of oriented gradient computed over the y direction;

calculating a first entropy of the histogram of oriented gradient computed over the x direction and calculating a second entropy of the histogram of oriented gradient computed over the y direction;

calculating a total histogram of oriented gradient entropy, wherein the total histogram of oriented gradient entropy equals the summation of the first entropy of the histogram of oriented gradient computed over the x direction and the second entropy of the histogram of oriented gradient computed over the y direction;

calculating a sum of entropy deltas for the picture, wherein the sum of entropy deltas equals the summation of the difference between two consecutive pictures for a predetermined set of consecutive pictures;

comparing the sum of entropy deltas for the picture with a predetermined entropy threshold, and if the sum of entropy deltas for the picture is greater than the predetermined entropy threshold then setting a sum of entropy deltas metric to zero, else the sum of entropy deltas metric equals a function of the difference of the predetermined entropy threshold and the sum of entropy deltas; and calculating a flashiness exception weight, wherein the flashiness exception weight equals an exponential function of the sum of entropy deltas metric.

11. A system for detecting artifacts in a video having a sequence of consecutive one or more pictures comprising an internal memory storing one or more program modules;

a reference picture unit configured for calculating a motion vector cost between a current picture and at least one previously filtered picture from the sequence of consecutive one or more pictures;

computing a filter coefficient based on the motion vector cost; and applying a filter using the filter coefficient on the current picture to create a filtered picture to be used for next iteration;

a filter for calculating a variable threshold for each of the one or more pictures, wherein the variable threshold for each picture is based on the variable threshold of the corresponding previous picture; and a processor configured for executing the program modules stored in the internal memory; wherein the processor is configured for monitoring the sequence of one or more pictures for a scene change, wherein the step of monitoring comprises of comparing the motion vector cost of each picture with the corresponding variable threshold of the picture, and if the motion vector cost for the picture is greater than the variable threshold of the picture, then calculating a first confidence value and a second confidence value for the picture, wherein the first confidence value and the second confidence value are based on the motion vector cost of the picture, motion vector cost of one or more previous pictures and motion vector cost of one or more subsequent pictures;

comparing the first confidence value with the second confidence value for the picture, and setting a scene change metric for the picture to be equal to the first confidence value if the first confidence value is higher than the second confidence value, else setting the scene change metric for the picture to be equal to the second confidence value;

calculating an artifact metric for the picture, wherein the artifact metric is an exponential function of the motion vector cost of the pictures, variable threshold of the picture, and the scene change metric of the picture;

selectively calculating one or more artifact exception weights for determining impact of one or more exceptions to the artifacts in the video;

calculating an artifact reporting metric, wherein the artifact reporting metric equals the product of the artifact metric and one or more selected artifact exception weights; and comparing the artifact reporting metric for the picture with a programmable artifact reporting threshold, if the artifact reporting metric for the picture is greater than the artifact reporting threshold then reporting the video as having an artifact.

12. The system as claimed in claim 11, wherein the reference picture unit is configured for calculating filtered pixels for each picture by calculating a weighted sum of each pixel of the current picture and filtered pixel of the previous picture wherein the weight is based on the motion estimation of one or more previous pictures.

13. The system as claimed in claim 11, wherein the filter is a Finite impulse response filter.

14. The system as claimed in claim 11, wherein the filter is an Infinite impulse response filter.

15. The system as claimed in claim 11, wherein the processor for calculating one or more artifact exception weights is configured for counting a number of scene changes for a predetermined set of consecutive pictures;

calculating a scene change density metric, wherein the scene change density metric equals the output of a leaky accumulator Infinite Impulse Response filter taking the number of scene changes for the predetermined set of consecutive pictures as input;

calculating an artifact exception weight wherein the artifact exception weight equals an exponential function of the scene change density metric.

16. The system as claimed in claim 11, wherein the processor for calculating one or more artifact exception weights is configured for determining an autocorrelation between motion vector costs of a predetermined set of consecutive pictures;

determining one or more zero crossings of the auto correlation;

determining an average zero crossing of the auto correlation;

determining a first cadence confidence metric and a second cadence confidence metric;

determining an overall cadence confidence value, wherein the overall cadence confidence value equals the maximum of either first cadence confidence metric or the second cadence confidence metric clamped between zero and a predetermined cadence threshold; and calculating an artifact exception weight wherein the artifact exception weight equals an exponential function of the product of the overall cadence confidence value and the predetermined cadence threshold.

17. The system as claimed in claim 11, wherein the processor for calculating one or more artifact exception weights is configured for determining a luminance histogram for the picture and a predetermined number of consecutive previous pictures and a predetermined number of consecutive subsequent picture;

calculating area of luminance histogram;

calculating area under the picture for the luminance histogram;

determining a skewness value between the area of luminance histogram and area under the picture for the luminance histogram, wherein the skewness value equals the result of the division of the area of luminance histogram by the area under the picture for the luminance histogram;

determining a skewness metric, wherein the skewness metric equals the difference between the skewness value of the previous picture and the skewness value of the current picture; and comparing the skewness metric with a predetermined skewness threshold, and if the skewness metric is greater than the skewness threshold then calculating an artifact exception weight wherein the artifact exception weight equals an exponential function of the skewness metric.

18. The system as claimed in claim 11, wherein the processor for calculating one or more artifact exception weights is configured for determining a first histogram of oriented gradient computed over the x direction and a second histogram of oriented gradient computed over the y direction for the entire picture;

calculating the area of the first histogram of oriented gradient computed over the x direction and the area of the second histogram of oriented gradient computed over the y direction;

calculating a first entropy of the histogram of oriented gradient computed over the x direction and calculating a second entropy of the histogram of oriented gradient computed over the y direction;

calculating a total histogram of oriented gradient entropy, wherein the total histogram of oriented gradient entropy equals the summation of the first entropy of the histogram of oriented gradient computed over the x direction and the second entropy of the histogram of oriented gradient computed over the y direction;

calculating a sum of entropy deltas for the picture, wherein the sum of entropy deltas equals the summation of the difference between two consecutive pictures for a predetermined set of consecutive pictures;

comparing the sum of entropy deltas for the picture with a predetermined entropy threshold, and if the sum of entropy deltas for the picture is greater than the predetermined entropy threshold then setting a sum of entropy deltas metric to zero, else the sum of entropy deltas metric equals a function of the difference of the predetermined entropy threshold and the sum of entropy deltas; and calculating an artifact exception weight, wherein the artifact exception weight equals an exponential function of the sum of entropy deltas metric.

* * * * *